US011914960B2

(12) United States Patent
Shroff et al.

(10) Patent No.: US 11,914,960 B2
(45) Date of Patent: Feb. 27, 2024

(54) SYSTEM AND METHOD FOR STATISTICAL SUBJECT IDENTIFICATION FROM INPUT DATA

(71) Applicant: Tata Consultancy Services Limited, Mumbai (IN)

(72) Inventors: Nidhi Harshad Shroff, Mumbai (IN); Paras Dwivedi, Mumbai (IN); Siva Prasad Pusarla, Mumbai (IN); Sudhakara Deva Poojary, Mumbai (IN); Pranav Champaklal Shah, Mumbai (IN); Varsha Nayak, Mumbai (IN); Amit Aggrawal, Mumbai (IN); Godfrey Claudin Mathais, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 329 days.

(21) Appl. No.: 17/450,062

(22) Filed: Oct. 5, 2021

(65) Prior Publication Data

US 2023/0028304 A1    Jan. 26, 2023

(30) Foreign Application Priority Data

Jun. 23, 2021   (IN) .............................. 202121028201

(51) Int. Cl.
*G06F 40/284* (2020.01)
*G06F 40/166* (2020.01)
(Continued)

(52) U.S. Cl.
CPC .......... *G06F 40/284* (2020.01); *G06F 40/117* (2020.01); *G06F 40/166* (2020.01); *G06F 40/216* (2020.01)

(58) Field of Classification Search
CPC .... G06F 40/284; G06F 40/166; G06F 40/216; G06F 40/117
See application file for complete search history.

(56) References Cited

U.S. PATENT DOCUMENTS 8,473,279 B2   6/2013   Al-Shammari
10,235,681 B2   3/2019   Chang et al.

FOREIGN PATENT DOCUMENTS

JP           5379239 B2      12/2013
WO       WO-9710557 A1 *   3/1997   ....... G06F 17/30707

OTHER PUBLICATIONS

Rahmoun et al., Experimenting N-Grams in Text Categorization, The International Arab Journal of Information Technology, vol. 4, No. 4, Oct. 2007, whole document (Year: 2007).*

(Continued)

*Primary Examiner* — Sonia L Gay
(74) *Attorney, Agent, or Firm* — FINNEGAN, HENDERSON, FARABOW, GARRETT & DUNNER, LLP

(57) ABSTRACT

Embodiments provide a system and method for statistical subject identification. The system takes texts, videos, audios, and images as input for which subject needs to be identified. The system pre-process input data and generates n-grams and pre-processed text strings by removing stopwords, punctuations, selective POS tags and lemmatization. Frequency distribution of n-grams are computed, and weightage of n-grams is assigned. For each n-gram, sum of weights across all text strings is computed and a maximum weightage is identified. The computed value as a result of taking a ratio of two, is assigned to each of the n-grams. Values computed for the n-grams have a non-normal distribution, when observed statistically. Thus, the n-gram values are transformed to confidence value following a normal distribution. The system maps the n-gram domains using a (Continued)

domain lexicon. Finally, these domains are aggregated and converged for subject identification based on a pre-annotated mapping dictionary.

7 Claims, 7 Drawing Sheets

(51) Int. Cl.
  *G06F 40/216* (2020.01)
  *G06F 40/117* (2020.01)

(56) References Cited

OTHER PUBLICATIONS

Jalal, Ahmed Adeeb et al., "Text documents clustering using data mining techniques", International Journal of Electrical and Computer Engineering (IJECE), Date: Feb. 2021, vol. 11, No. 1, pp. 664~670, Publisher: IJECE, https://pdfs.semanticscholar.org/7e6b/7434ac6281a7186baabf228bc0b3e526a0f.pdf.

* cited by examiner

SYSTEM AND METHOD FOR STATISTICAL SUBJECT IDENTIFICATION FROM INPUT DATA

CROSS-REFERENCE TO RELATED APPLICATIONS AND PRIORITY

This U.S. patent application claims priority under 35 U.S.C. § 119 to India Application No. 202121028201, filed on Jun. 23, 2021. The entire content of the abovementioned application is incorporated herein by reference.

TECHNICAL FIELD

The disclosure herein generally relates to the field of subject identification and more specifically, to a system and method for statistical subject identification from plurality of input data.

BACKGROUND

In the field of Natural Language Processing (NLP), for a machine to take context-based decisions, there is a need to identify the subject area and jargons related to the subject area. In multiple applications, for instance Frequently Asked Question (FAQ) chatbot creation, it is required that a bot be trained with multiple ways in which queries could be asked to invoke individual answers.

In order to identify subject of unseen data, existing approaches require a pre-trained model. Herein, the pre-trained model is a model that was trained on a reference dataset (having input parameters as well as corresponding output) to solve a problem similar to the one that is required to be solved. For example, in current context, a set of annotated data containing the text and corresponding subject area is used to train a model and this is later used to decipher subject for the new text data in future. This approach has dependency on the training data resulting with following drawbacks:
   a. A large amount of annotated data is required for training the model, that consumes time and effort.
   b. Different models created with different set of training data, could give varying results for the same input text data.
   c. The bias introduced due to the choice of data used while creating the pre-trained model, can often produce inconsistent results.

SUMMARY OF THE INVENTION

Embodiments of the disclosure present technological improvements as solutions to one or more of the above-mentioned technical problems recognized by the inventors in conventional systems. For example, in one embodiment, a system and method for statistical subject identification from variety of unseen input data is provided.

In one aspect, a processor-implemented method for statistical subject identification from variety of unseen input data is provided. The method includes one or more steps such as receiving a plurality of input data from a user, wherein the plurality of input data includes text strings, images, audios, and videos. Herein, the received images, audios and videos are also converted into text strings using a transcription model. If only one text string is obtained, then it is split into plurality of text strings, for further processing. Further, plurality of text strings is pre-processed to obtain n-grams and corresponding pre-processed text strings. A frequency distribution is computed for n-grams for each of the pre-processed text strings. Further, a weightage of the n-grams is calculated with respect to the pre-processed text strings. Herein, the weightage is a frequency scaled considering size of each of the pre-processed text string and the plurality of pre-processed text strings. A ratio of sum of the calculated weightage of each n-gram across plurality of pre-processed text strings to a maxima weightage of the n-gram is determined.

Further, the method includes calculating a n-gram confidence value using a box-cox transformation over the determined ratio to obtain a normal distribution and identifying one or more nodes of significance from the obtained normal distribution based on higher values than a predefined dynamic threshold value of n-grams. Further, the processor-implemented method includes mapping the identified one or more nodes of significance using a predefined domain lexicon to identify one or more domains against each of the one or more nodes of significance and simultaneously the one or more domains to a plurality of subject areas and simultaneously computing a score by adding the corresponding confidence value, as associated with the significant node, for that subject. Finally, at least one subject is identified based on the computed score to each of the one or more subjects.

In another aspect, a system for statistical subject identification from a plurality of input data is provided. The system includes an input/output interface to receive a plurality of input data from a user, wherein the plurality of input data includes text strings, images, audios, and videos. It is to be noted that the received images, the audios, and the videos are converted into corresponding text strings using a transcription model. Further, the system includes one or more hardware processors and at least one memory storing a plurality of instructions, wherein the one or more hardware processors are configured to execute the plurality of instructions stored in at least one memory.

Further, if only one text string is obtained, then it is split into plurality of text strings, for further processing. The system is configured to pre-process the received and converted text strings to obtain pre-processed text strings and n-grams corresponding to each of the pre-processed text strings. A frequency distribution is computed for n-grams for each of the plurality of pre-processed text strings. Further, a weightage of the n-grams is calculated with respect to the pre-processed text strings. Herein, the weightage is a frequency scaled considering size of each of the pre-processed text string as well as the plurality of pre-processed text strings A ratio of sum of the calculated weightage of each n-gram across plurality of pre-processed text strings to a maxima weightage of the n-gram is determined. A n-gram confidence value is calculated using a box-cox transformation over the determined ratio to obtain a normal distribution and one or more nodes of significance are identified from the obtained normal distribution based on higher values than a predefined dynamic threshold value of n-grams. Further, the processor-implemented method includes mapping the identified one or more nodes of significance using a predefined domain lexicon to identify one or more domains against each of the one or more nodes of significance and the one or more domains to a plurality of subject areas and simultaneously computing a score by adding the corresponding confidence value (as associated with the significant node) for that subject. Finally, at least one subject is identified based on the computed score to each of the one or more subjects.

In yet another aspect, there are provided one or more non-transitory machine-readable information storage mediums comprising one or more instructions, which when executed by one or more hardware processors causes a method for statistical subject identification from variety of unseen input data is provided. The method includes one or more steps such as receiving a plurality of input data from a user, wherein the plurality of input data includes one or more text strings, one or more images, one or more audios, and one or more videos. Herein, the received one or more images, the one or more audios, and one or more videos are converted into text strings using a transcription model. If only one text string is obtained, then it is split into plurality of text strings, for further processing. Further, the plurality of text strings is pre-processed to obtain n-grams and corresponding pre-processed text strings. A frequency distribution is computed for n-grams for each of the text strings. Further, a weightage of the n-grams is calculated with respect to the pre-processed text strings. Herein, the weightage is a frequency scaled considering size of each of the pre-processed text string as well as the plurality of pre-processed text strings. A ratio of sum of the calculated weightage of each n-gram across plurality of pre-processed text strings to a maxima weightage of the n-gram is determined. A n-gram confidence value is calculated using a box-cox transformation over the determined ratio to obtain a normal distribution and one or more nodes of significance are identified from the obtained normal distribution based on higher values than a predefined dynamic threshold value of n-grams. Further, the processor-implemented method includes mapping the identified one or more nodes of significance using a predefined domain lexicon to identify one or more domains against each of the one or more nodes of significance and the one or more domains to a plurality of subject areas and simultaneously computing a score by adding the corresponding confidence value (as associated with the significant node) for that subject. Finally, at least one subject is identified based on the computed score to each of the one or more subjects.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
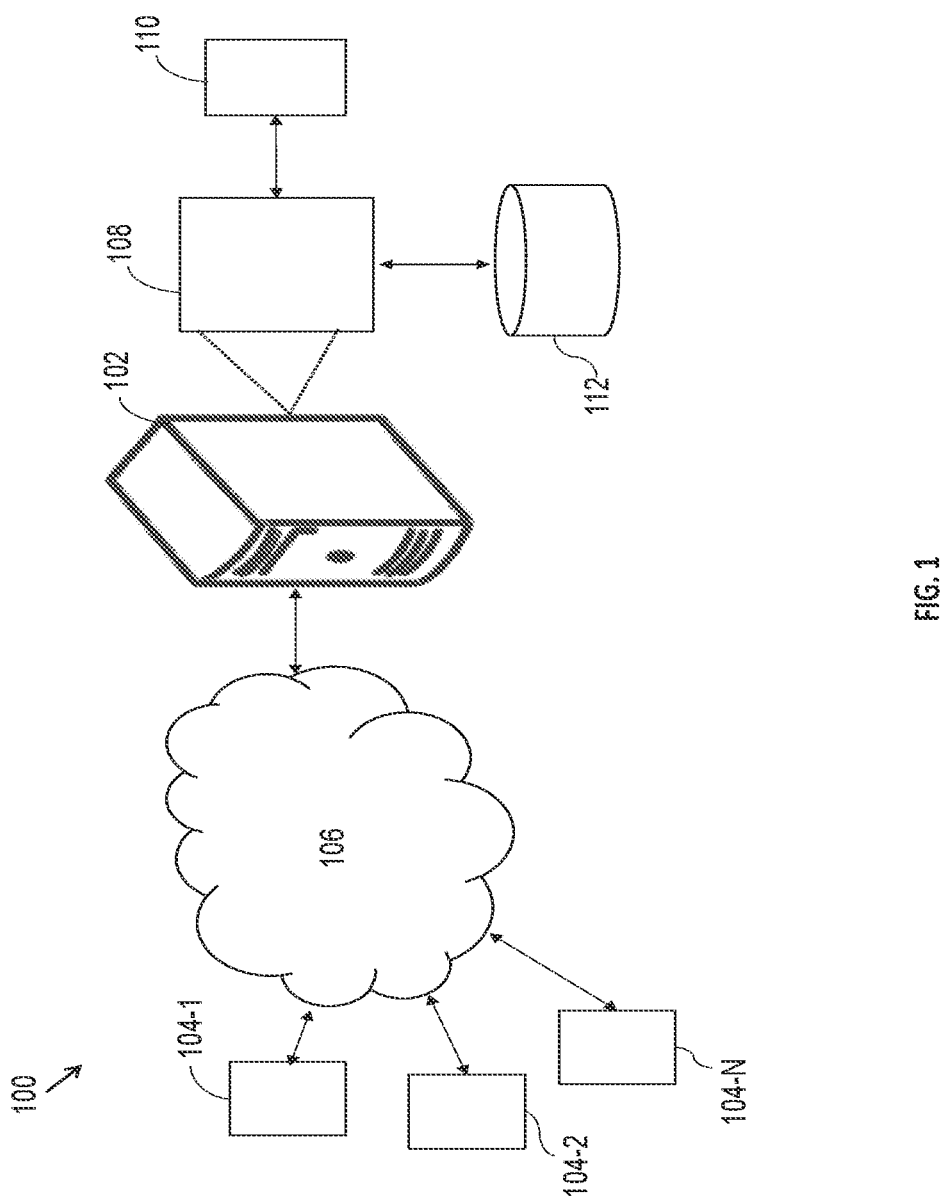
FIG. 1 illustrates a network diagram of an exemplary system for statistical subject identification from input data, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a system and method for statistical subject identification from a variety of unseen input data. It would be appreciated that most of the subject identification approaches available are based on designing a model pre-trained with manually annotated data, which could create a bias depending on the training data. Proposed approach identifies the subject on the basis of given text without the need of a pre-trained model, minimizing the bias that could encroach due to selection of training data. The approach supports a plurality of input streams like audio, video, and images along with text and offers multilingual support. It would be appreciated that the subject area(s) and subject(s) similarly significant node(s) and node(s) of significance are used hereinafter interchangeably.

The system is configured to take list of string as input for which subject area needs to be identified. The system expands contractions and removes tags. Further, the system generates n-grams (filtering stopwords and punctuations and words having part-of-speech (PoS) tag among the predefined list consisting the likes of proper nouns, auxiliary verbs and so on) and the generated n-grams are lemmatized. Frequency distribution of n-grams are computed and weightage of n-grams with respect to plurality of pre-processed text strings is assigned. It is to be noted that for each n-gram, the sum of weights across plurality of pre-processed text strings are computed and a maximum weightage is calculated across the plurality of pre-processed text strings and the computed value as a result of taking a ratio of the two, is assigned to each of the n-grams. To generate a n-gram confidence value, a box-cox transformation is applied. Values computed for the n-grams have a non-normal distribution, when observed statistically. Thus, the n-gram values are transformed to confidence value following a normal distribution. It would be appreciated that the selection of n-grams based on a predefined dynamic threshold is easier from the normal distribution by extracting only the n-grams having confidence values higher than the predefined dynamic threshold would be selected as nodes of significance. The system maps the n-gram domains using a domain lexicon. Finally, these domains are aggregated and converged for subject identification based on a pre-annotated mapping dictionary such that, for instance, 'football', 'volleyball' would converge to sports.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 illustrates an exemplary system (100) for statistical subject identification, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user a portable computer, a personal digital assistant, a handheld device, a smartphone, a tablet computer, a workstation, and the like. The I/O interface (104) are communicatively coupled to the system (100) through a communication network (106).

In an embodiment, the communication network (106) may be a wireless or a wired network, or a combination thereof. In an example, the communication network (106) can be implemented as a computer network, as one of the different types of networks, such as virtual private network (VPN), intranet, local area network (LAN), wide area network (WAN), the internet, and such. The communication network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the communication network (106) may include a variety of network devices, including routers, bridges, servers, computing devices, storage devices. The network devices within the communication network (106) may interact with the system (100) through communication links.

The system (100) supports various connectivity options such as BLUETOOTH®, USB, ZigBee and other cellular services. The communication network (106) environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
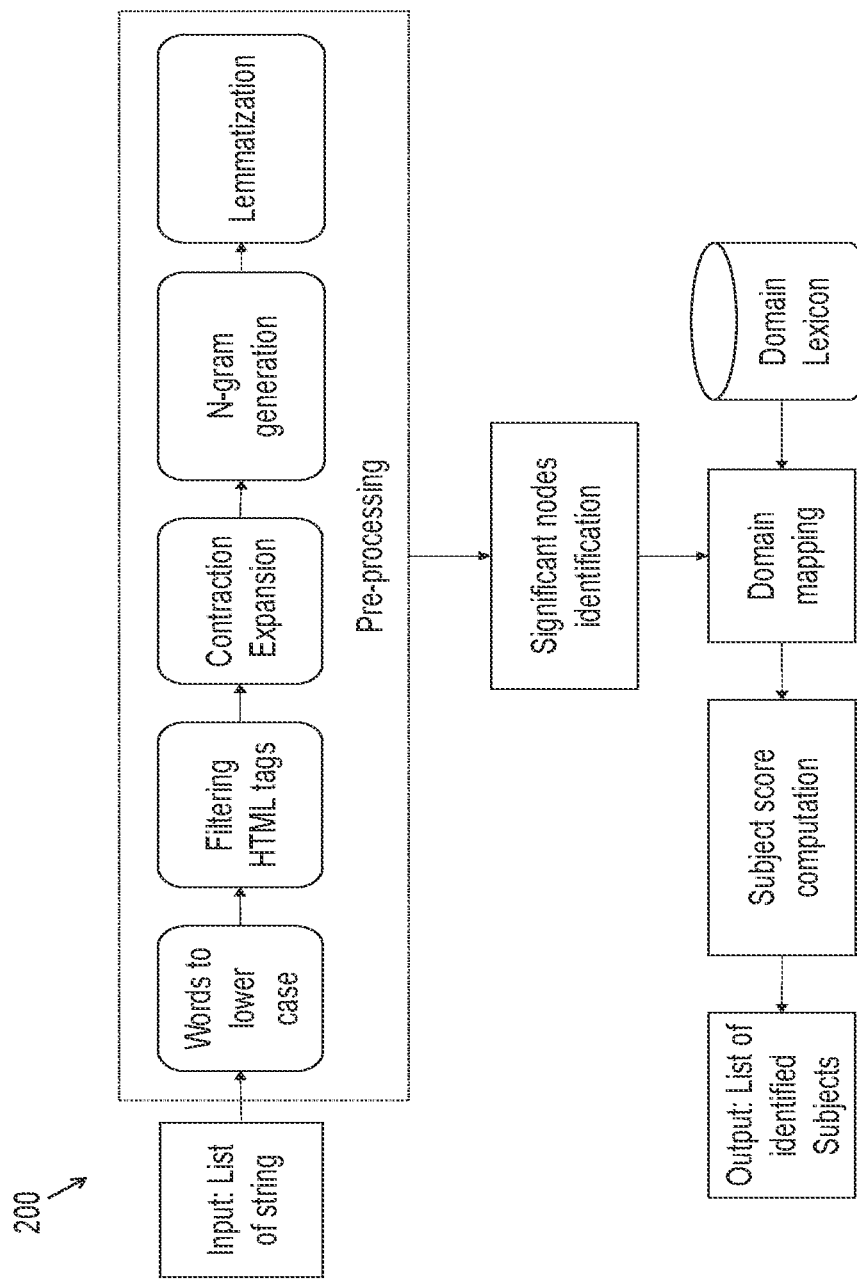
FIG. 2 is a functional block diagram to illustrate the system for statistical subject identification from input data, according to an embodiment of the present disclosure.

Referring FIG. 2, a functional flow diagram (200) of the system (100) illustrating a statistical subject identification, in accordance with an example embodiment. The system (100) comprises at least one memory with a plurality of instructions, one or more databases (112), one or more input/output (I/O) interfaces (104) and one or more hardware processors (108) which are communicatively coupled with the at least one memory to execute a plurality of modules therein.

Figure 3:
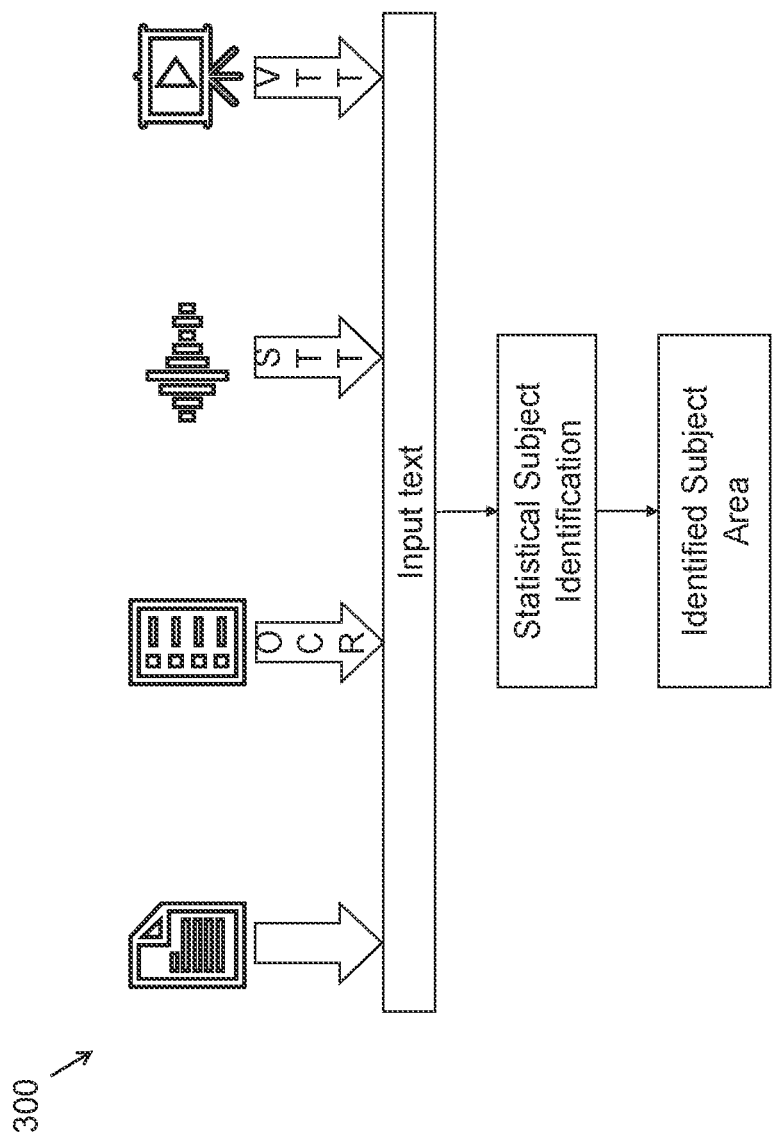
FIG. 3 is a functional flow chart illustrating subject area identification, in accordance with some embodiments of the present disclosure.

The one or more I/O interfaces (104) are configured to receive an input data including a text string, one or more images, one or more videos and one or more audios, wherein the received one or more images, one or more videos and the audio are converted into a text string using a transcription model as shown in FIG. 3. The one or more I/O interfaces (104) are configured to recommend at least one subject based on the score to each of the one or more mapped subjects from the system (100) back to the user via a web interface layer (106).

In one aspect, considering a list of text strings in input. Let s represent each string from the list of input strings, which undergoes removal of HTML tags, contraction treatment, n-gram creation, stop word removal and cleaning with respect to punctuations and token-length and lemmatization is then transformed into pre-processed text strings and a dense matrix D having confidence value of n-grams occurring across the plurality of pre-processed text strings by learning the vocabulary of plurality of pre-processed text strings and computing weightage, calculated over plurality of pre-processed text strings significant nodes are identified on the basis of the dense matrix.

In one embodiment, the system (100) is configured to pre-process the list of input strings by expanding contractions and removing HTML tags from the received plurality of input data and converting them to lower case. It would be appreciated that the expanding the contraction to the original form helps the computer understand the data. While processing the text, the contractions are replaced by their expanded forms or using the likes of contractions (a python library) to consider the grammatical context when expanding. Sometimes, the input data may contain HTML tags enclosed in angular brackets to maintain the formatting. For example, <br> for line break or <b> for bold are removed by looking for the patterns (< >) when parsing through the text and in case of match, the < > including the data enclosed within the angular brackets.

It would be appreciated that the n-grams are sequence of n nodes that occur in that specific order, where n is a number. For example, consider a sentence, 'For pedagogical purposes we have only described protoplasm.' The n-grams are obtained by parsing through the text strings word by word and collecting the sequence of words taking into consideration the following rules for any and all of the words in constituting the n-grams:

words should not contain numeric;
words should not be a stop-word or punctuation;
words should not be a list item marker or a spelled-out number or a proper noun or a pronoun or auxiliary verb or modal verb or
prepositions and subordinating conjunctions; and
words should not be shorter than three letters.

Further, the system (100) is configured to lemmatize the n-grams using a predefined library. For example, a unigram 'received' lemmatization would give 'receive' as output using spacy. The lemmatized n-grams are easier for the computer to comprehend. Similarly, the text strings are treated to ignore the words (according to the criteria specified for n-gram generation) and lemmatized to obtain pre-processed text strings.

Further, the system (100) takes n-grams for each of the plurality of pre-processed text strings to compute a frequency distribution. The number of times each n-gram occurs in the plurality of pre-processed text strings would be crucial in understanding the role of the n-gram in the pre-processed text string. A tabular structure is created with the frequency of the lemmatized n-grams against each of the plurality of pre-processed text strings by looping through each of the plurality of pre-processed text strings i.e. ratio of the frequency of the n-gram to total number of n-grams in the pre-processed text string.

Further, the system (100) is configured to calculate weightage of the n-grams with respect to the plurality of pre-processed text strings. Herein, the weightage is a frequency scaled considering size of each of the pre-processed text string and plurality of pre-processed text strings. However, when gauging the n-gram with the frequency, it is required to take into account the size of the plurality of pre-processed text strings. It is to be noted that the frequency of the n-grams gives perspective for the n-gram only for the specific pre-processed text string, but it is also fairly important to have a normalized view with respect to the other pre-processed text strings in the plurality of pre-processed text strings.

In one instance, let N be the total number of pre-processed text strings created by splitting and preprocessing the text strings. For each n-gram, weightage is computed by multiplying the frequency of the n-gram with the logarithmic ratio of total number of pre-processed text strings to minima of the number of pre-processed text strings containing the n-gram and the remaining number of pre-processed text strings; if the n-gram is present in all N pre-processed text strings, then weightage is calculated as multiplication of the frequency of n-gram and the logarithmic value of N. This provides all the n-grams as present across all the pre-processed text strings and their weightages for each of the pre-processed text strings.

The weightage for each of the pre-processed text strings is computed as below:

$$\text{weightage} = \begin{cases} f_{n-gram} * \log_{10}(N), & \text{if } val = N \\ f_{n-gram} * \log_{10}\left(\dfrac{N}{\min(val, (N-val))}\right), & \text{if } val \neq N \end{cases}$$

wherein, $f_{n-gram}$=frequency of n-gram val=number of pre-processed text strings in which the n-gram occurs N=total number of pre-processed text strings.

In another embodiment, the system (100) is configured to determine a ratio of sum of the calculated weightage of each n-gram across plurality of pre-processed text strings to a maxima weightage of the n-gram. For each n-gram, the system computes the sum of weightages across plurality of pre-processed text strings, and finds the maximum weightage across plurality of pre-processed text strings, and the value obtained as result of taking a ratio of the two, is assigned to each of the n-grams.

In another embodiment, wherein the system (100) is configured to generate n-gram confidences by applying box-cox transformations. It would be appreciated that the box-cox transformation is used to transform a non-normal distribution into a normal one. Thus, the n-gram values are transformed to confidence values following a normal distribution.

Figure 4:
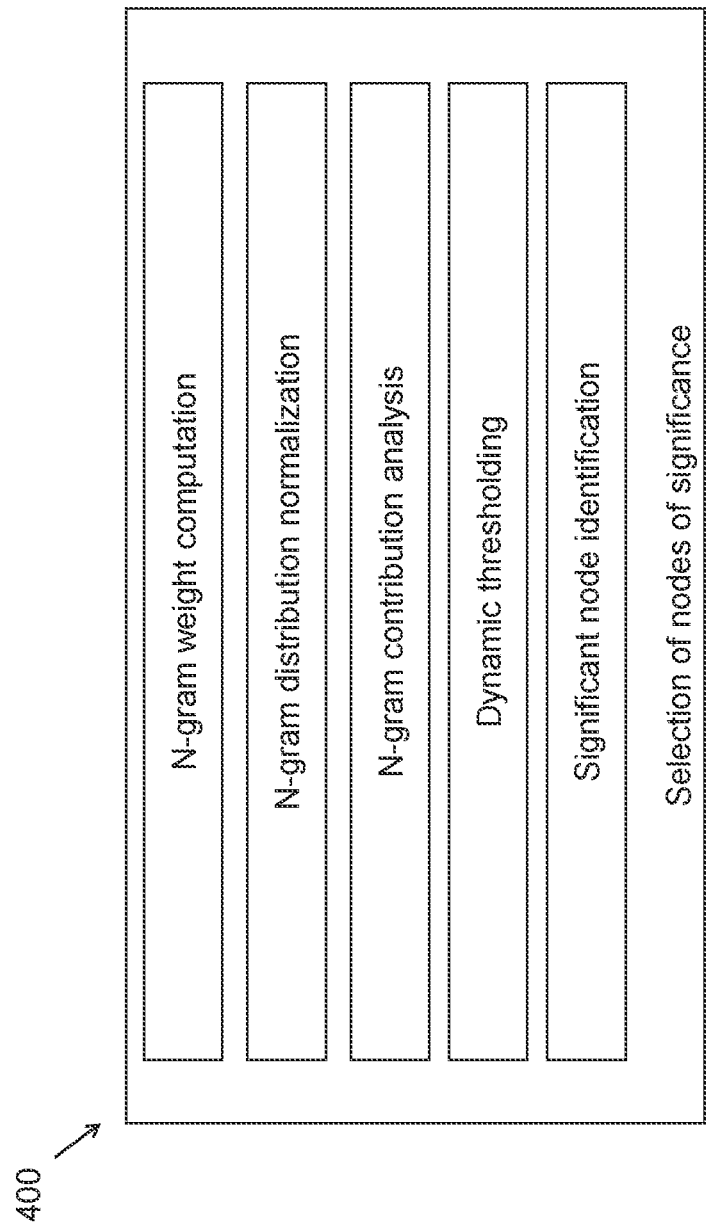
FIG. 4 is a flow diagram to illustrate selection of nodes of significance, in accordance with some embodiments of the present disclosure.

Referring FIG. 4, a functional flow diagram (400) of the system (100) illustrating a significant node identification, in accordance with an example embodiment. The system (100) is configured to identify one or more nodes of significance from the obtained normal distribution based on higher values than a predefined dynamic threshold value of n-grams. Herein, the predefined dynamic threshold depends on the obtained normal distribution. It is to be noted that the nodes of significance are identified from the normal distribution by extracting only the n-grams having confidence values in the fourth quartile. The confidence values computed by taking 75% of the highest confidence value present in the normal distribution, would be considered a threshold and all the n-grams having confidence values higher than this, would be selected as nodes of significance.

Figure 5:
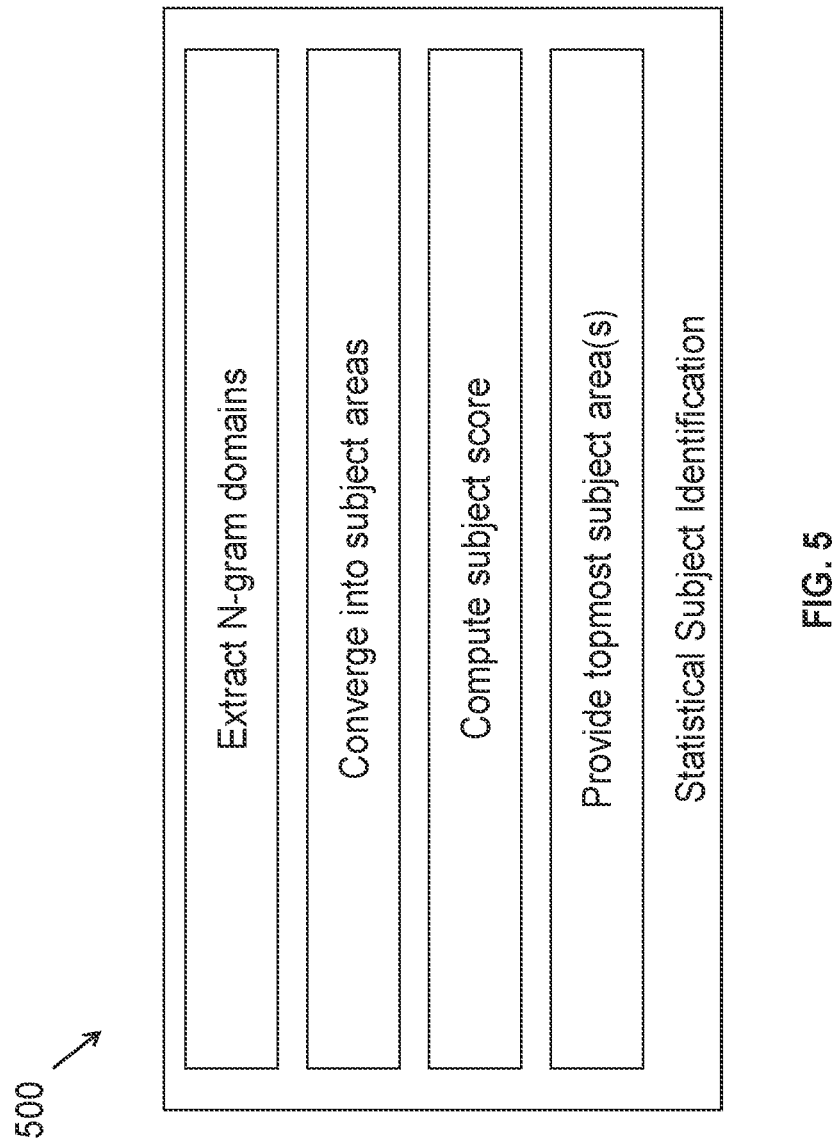
FIG. 5 is a flow diagram to illustrate statistical subject identification, according to an embodiment of the present disclosure.

Referring FIG. 5, a flow diagram (500), wherein the system (100) is configured to map the identified one or more nodes of significance with a predefined domain lexicon to identify one or more domains against each of the one or more nodes of significance. Further, the identified one or more domains are mapped against a plurality of subject areas and simultaneously computing a score by adding the corresponding significant node confidence for the plurality of subject areas.

Figure 6:
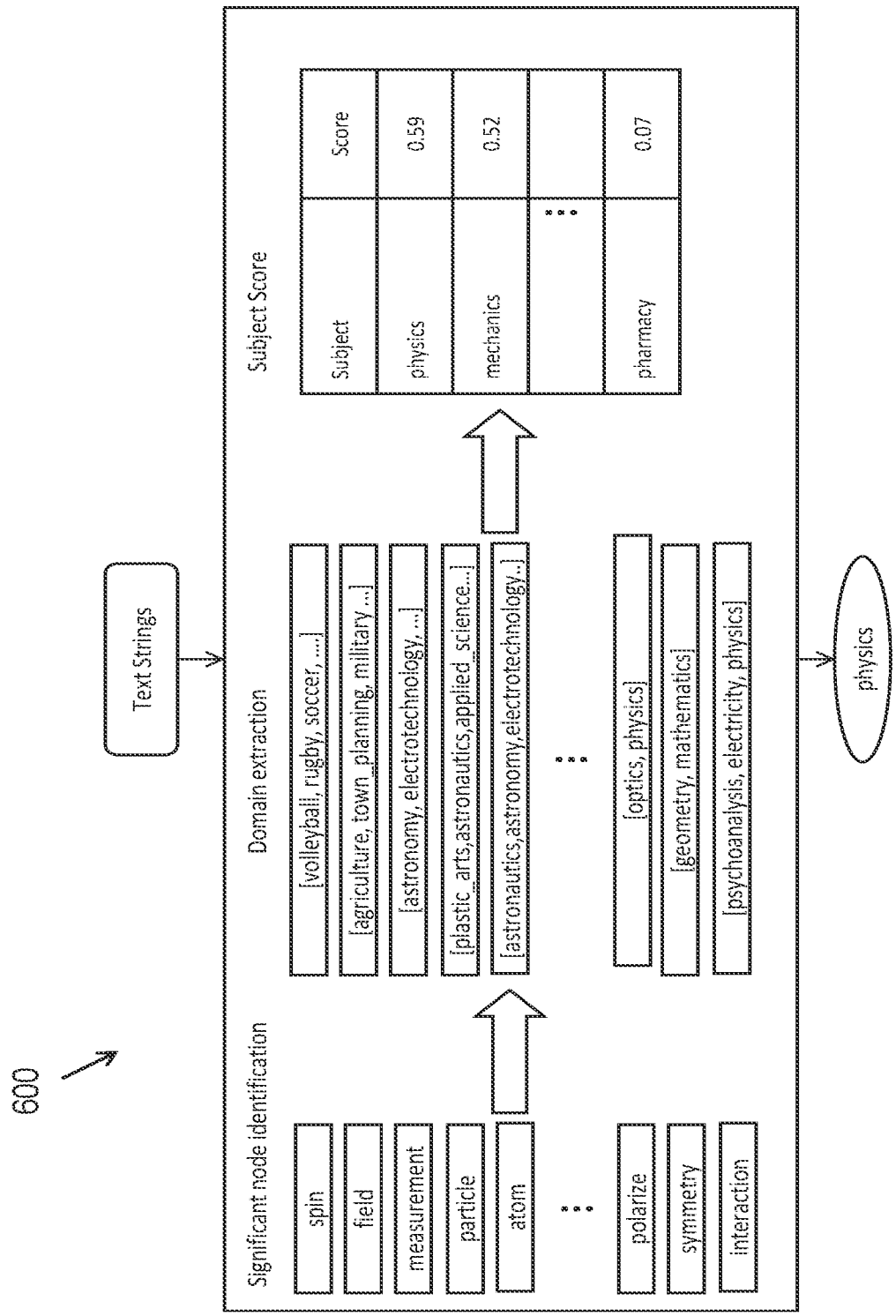
FIG. 6 is a schematic diagram to illustrate an example of statistical subject identification from input data, according to an embodiment of the present disclosure.

Referring FIG. 6, an example to illustrate the system (100) of FIG. 1 wherein the system (100) takes list of string as input for which domain needs to be identified. Two text strings such as "Spin-polarized atoms are also used to address fundamental questions in particle physics. Precision measurements of interactions between spin-polarized atoms and external fields can reveal the properties of elementary particle interactions. Time reversal symmetry, CP and CPT symmetry, and Lorentz invariance are being tested in such experiments." "For example, measurements of the precession frequency of Xe-129 spins in a strong electric field determine the electric dipole moment of Xe-129, which is sensitive to CP violation beyond the Standard Model needed to explain the asymmetry between matter and anti-matter in the Universe". These two lists of strings are converted to single strings by concatenating them by space, post which that whole string is converted to lowercase. Further, the text strings are pre-processed using Spacy library to achieve a resultant set:

{'asymmetry', 'dipole', 'precision', 'determine', 'test', 'reverse', 'physics', 'time', 'matter', 'explain', 'elementary', 'universe', 'questions', 'moment', 'field', 'violation', 'cpt', 'symmetry', 'external', 'precession', 'atom', 'polarize', 'particle', 'reveal', 'electric', 'standard', 'strong', 'fundamental', 'interaction', 'experiment', 'invariance', 'anti', 'lorentz', 'frequency', 'spin', 'address', 'property', 'example', 'model', 'measurement', 'sensitive'} Herein, it would be appreciated that the number n for n-grams can be calibrated. For example, considering only unigrams.

Further, weightage for these nodes are computed using relative frequency accounting for the size of the pre-processed text strings as well as the plurality of pre-processed text strings Mathematical computations are applied over these weightages and then normalized to give associated n-gram confidences. The predefined dynamic threshold, calculated using the n-gram confidences, is used to filter out nodes of significance. These nodes of significance are mapped to get domains which are then converged to subject areas. The associated score for the subject areas is computed by adding the corresponding significant node confidence. One or more subject areas with highest score are returned as output.

Figure 7:
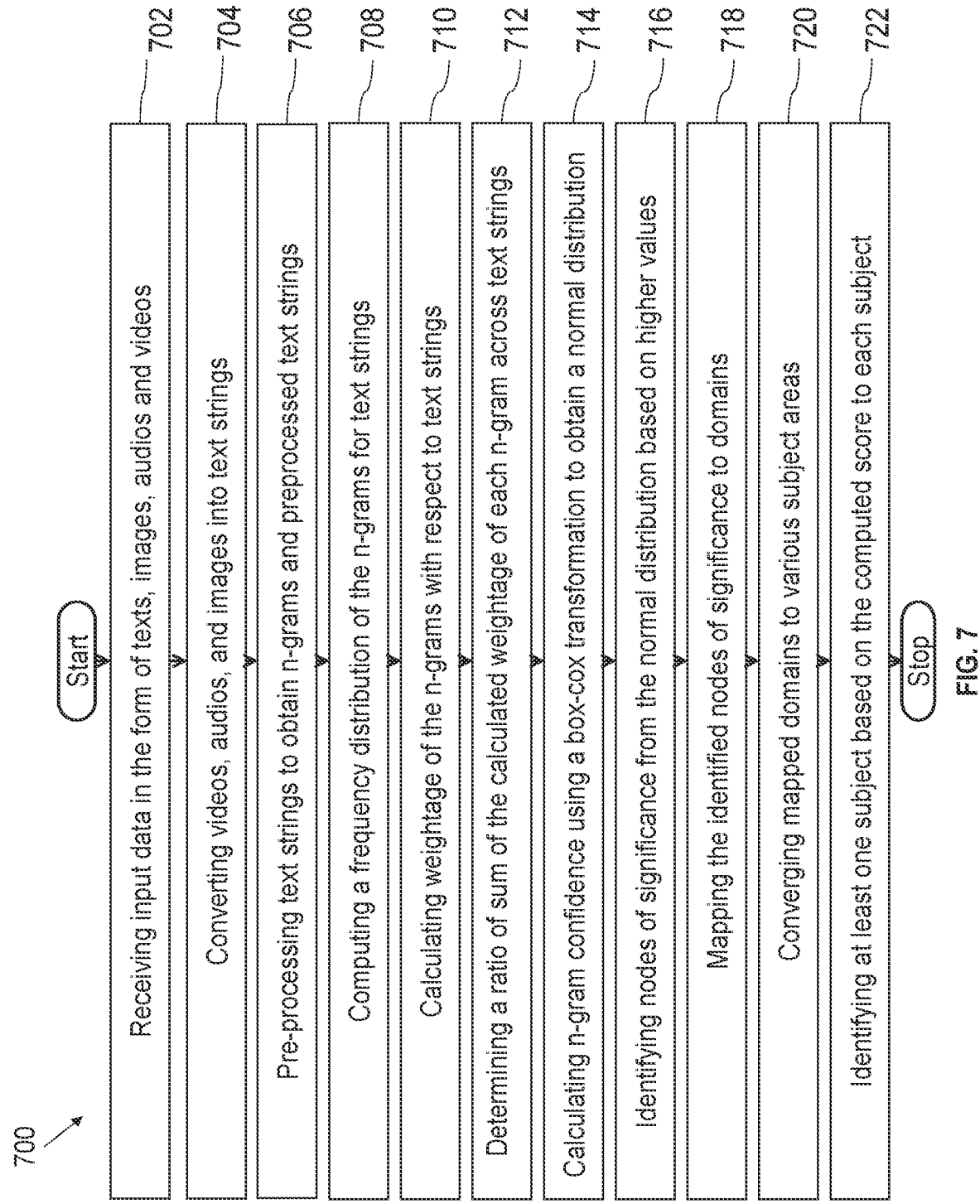
FIG. 7 is a flow diagram to illustrate a method for statistical subject identification from input data, according to an embodiment of the present disclosure.

Referring FIG. 7, a flow diagram (700) to illustrate a processor-implemented method for statistical subject identification is provided. Initially, at the step (702), receiving a plurality of input data from a user, wherein the plurality of input data includes one or more text strings, one or more images, one or more audios, and one or more videos.

At the step (704), converting the received one or more images, the one or more audios, and one or more videos into text strings using a transcription model. It would be appreciated that the input data can be a list of strings or the whole of the text at once.

At the next step (706), the one or more text strings are pre-processed to obtain n-grams, and the one or more text strings are split into plurality of text strings. If the input contains only one text string, then it is split into plurality of text strings, for further processing. If the input contains multiple strings, they are treated as individual text strings.

At the next step (708), computing a frequency distribution of the n-grams for each of the pre-processed text string in plurality of pre-processed text strings.

At the next step (710), calculating a weightage of the n-grams with respect to the plurality of pre-processed text strings, wherein the weightage is a frequency scaled considering size of each of the pre-processed text string and plurality of pre-processed text strings.

At the next step (712), determining a ratio of sum of the calculated weightage of each n-gram across-plurality of pre-processed text strings to a maxima weightage of the n-gram.

At the next step (714), calculating a n-gram confidence value using a box-cox transformation over the determined ratio to obtain a normal distribution.

At the next step (716), identifying one or more nodes of significance from the obtained normal distribution based on higher values than a predefined dynamic threshold value of n-grams, wherein the dynamic threshold depends on the obtained normal distribution.

At the next step (718), mapping the identified one or more nodes of significance using a predefined domain lexicon such as WordNet to identify one or more domains against each of the one or more nodes of significance.

At the next step (720), converging the mapped one or more domains to a plurality of subject areas and simultaneously computing a score by adding the corresponding confidence value (as associated with the corresponding significant node) for that subject.

At the last step (722), identifying at least one subject based on the computed score to each of the one or more subjects.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of large amount of annotated data that is required for training the model and bias introduced due to the choice of data used while creating the pre-trained model which can often produce inconsistent results. Therefore, embodiments herein provide a system and method for statistical subject identification. The system is configured to take list of string as input for which domain needs to be identified. The system expands contractions and removes tags and converts to lower case. Further, the system generates n-grams and the generated n-grams are lemmatized, excluding stopwords, punctuations and words that have with certain POS tags including but not limited to proper noun, auxiliary verb. Frequency distribution of n-grams are computed and weightage of n-grams with respect to plurality of pre-processed text strings is assigned. It is to be noted that for each n-gram the sum of weights across all the pre-processed text string are computed and a maximum weightage is calculated across all the pre-processed text string. The computed value as a result of taking a ratio of the two, is assigned to each of the n-grams. To generate a n-gram confidence value, a box-cox transformation is applied. Values computed for the n-grams have a non-normal distribution, when observed statistically. Thus, the n-gram values are transformed to confidence value following a normal distribution. It would be appreciated that the selection of n-grams based on a dynamic threshold is easier from the normal distribution by extracting only the n-grams having confidence values higher than the dynamic threshold would be selected as nodes of significance. The system maps the n-gram domains using a domain lexicon. Finally, these domains are aggregated and converged for subject identification based on a pre-annotated mapping dictionary.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for statistical subject identification comprising:
   receiving, via an input/output interface, a plurality of input data from a user, wherein the plurality of input data includes text strings, images, audios, and videos;
   converting, via one or more hardware processors, the received images, audios, and videos into text strings using a transcription model;
   pre-processing, via the one or more hardware processors, the received and converted text strings to obtain pre-processed text strings and n-grams corresponding to each of the pre-processed text strings;
   computing, via the one or more hardware processors, a frequency distribution of the n-grams for the pre-processed text strings;
   calculating, via the one or more hardware processors, a weightage of the n-grams for the pre-processed text strings, wherein the weightage is a frequency scaled considering size of the corresponding pre-processed text strings;
   determining, via the one or more hardware processors, a ratio of sum of the calculated weightage of each n-gram across the pre-processed text strings to a maxima weightage of the n-gram;
   calculating, via the one or more hardware processors, an n-gram confidence value using a box-cox transformation over the determined ratio to obtain a normal distribution of the n-gram confidence values;
   identifying, via the one or more hardware processors, one or more nodes of significance from the obtained normal distribution based on one or more higher values of the calculated n-gram confidence values than a predefined dynamic threshold value, wherein the predefined dynamic threshold value depends on the obtained normal distribution;
   mapping, via the one or more hardware processors, the identified one or more nodes of significance to one or more domains using a predefined domain lexicon;
   converging, via the one or more hardware processors, the mapped one or more domains to a plurality of subject areas and simultaneously computing a score by adding the corresponding n-gram confidence value, associated with one or more nodes of significance, for that subject area; and
   identifying, via the one or more hardware processors, at least one subject area based on the computed score to each of the one or more subjects.

2. The processor-implemented method of claim 1, wherein pre-processing of the text strings comprising one or more steps of:
   removing, via the one or more hardware processors, one or more tags;
   expanding, via the one or more hardware processors, one or more contractions from the text strings;
   splitting, via the one or more hardware processors, the text strings into one or more documents;
   parsing, via the one or more hardware processors, the text strings to obtain n-grams;
   removing, via the one or more hardware processors, stopwords, nouns, pronouns, auxiliary verb, modal verb, list item marker, spelled-out number, prepositions and subordinating conjunctions, punctuations, tokens comprising non-alphabetic characters and having less than three characters from text strings; and
   lemmatizing, via the one or more hardware processors, the obtained n-grams to determine root form using a predefined library.

3. The processor-implemented method of claim 1, further comprising:
   splitting, via one or more hardware processors, the received text string, if the input data comprises only one text string, to obtain a plurality of text strings on the basis of a combination of number of words and at least one delimiter, wherein the at least one delimiter includes exclamation mark, question mark, and full stop.

4. A system for statistical subject identification comprising:
   an input/output interface to receive a plurality of input data from a user, wherein the plurality of input data includes text strings, images, audios, and videos;
   one or more hardware processors;
   a memory in communication with the one or more hardware processors, wherein the one or more hardware processors are configured to execute programmed instructions stored in the memory, to:
     convert the received images, audios, and videos into text strings using a transcription model;
     pre-process the received and converted text strings to obtain pre-processed text strings and n-grams corresponding to each of the pre-processed text strings;
     compute a frequency distribution of the n-grams for the pre-processed text strings;
     calculate a weightage of the n-grams for the pre-processed text strings, wherein the weightage is a frequency scaled considering size of the corresponding pre-processed text strings;
     determine a ratio of sum of the calculated weightage of each n-gram across the pre-processed text strings to a maxima weightage of the n-gram;
     calculate an n-gram confidence value using a box-cox transformation over the determined ratio to obtain a normal distribution of the n-gram confidence values;
     identify one or more nodes of significance from the obtained normal distribution based on higher values than a predefined dynamic threshold value of n-grams, wherein the predefined dynamic threshold depends on the obtained normal distribution;
     map the identified one or more nodes of significance using a predefined domain lexicon to identify one or more domains against each of the one or more nodes of significance;
     converge the one or more domains to a plurality of subject areas and simultaneously computing a score by adding the corresponding confidence, as associated with the significant node, for that subject; and
     identify at least one subject based on the computed score to each of the one or more subjects.

5. The system of claim 4, further comprising:
   splitting text string, via one or more hardware processors, if the input data comprises only one text string, to obtain a plurality of text strings on the basis of a combination of number of words and at least one delimiter, wherein the at least one delimiter includes exclamation mark, question mark, and full stop.

6. A non-transitory computer readable medium storing one or more instructions which when executed by one or more processors on a system, cause the one or more processors to perform method comprising:

receiving, via an input/output interface, a plurality of input data from a user, wherein the plurality of input data includes text strings, images, audios, and videos;

converting, via one or more hardware processors, the received images, audios, and videos into text strings using a transcription model;

pre-processing, via the one or more hardware processors, the received and converted text strings to obtain pre-processed text strings and n-grams corresponding to each of the pre-processed text strings;

computing, via the one or more hardware processors, a frequency distribution of the n-grams for the pre-processed text strings;

calculating, via the one or more hardware processors, a weightage of the n-grams for the pre-processed text strings, wherein the weightage is a frequency scaled considering size of the corresponding pre-processed text strings;

determining, via the one or more hardware processors, a ratio of sum of the calculated weightage of each n-gram across the pre-processed text strings to a maxima weightage of the n-gram;

calculating, via the one or more hardware processors, an n-gram confidence value using a box-cox transformation over the determined ratio to obtain a normal distribution of the n-gram confidence values;

identifying, via the one or more hardware processors, one or more nodes of significance from the obtained normal distribution based on one or more higher values of the calculated n-gram confidence values than a predefined dynamic threshold value, wherein the predefined dynamic threshold value depends on the obtained normal distribution;

mapping, via the one or more hardware processors, the identified one or more nodes of significance to one or more domains using a predefined domain lexicon;

converging, via the one or more hardware processors, the mapped one or more domains to a plurality of subject areas and simultaneously computing a score by adding the corresponding n-gram confidence value, associated with one or more nodes of significance, for that subject area; and identifying, via the one or more hardware processors, at least one subject area based on the computed score to each of the one or more subjects.

7. The non-transitory computer readable medium of claim 6, further comprising:

splitting text string, via one or more hardware processors, if the input data comprises only one text string, to obtain a plurality of text strings on the basis of a combination of number of words and at least one delimiter, wherein the at least one delimiter includes exclamation mark, question mark, and full stop.

* * * * *